United States Patent
Liu et al.

(10) Patent No.: US 11,172,227 B2
(45) Date of Patent: Nov. 9, 2021

(54) VIDEO SENDING AND RECEIVING METHOD, APPARATUS, AND TERMINAL THEREOF

(71) Applicant: GUANGZHOU BAIGUOYUAN INFORMATION TECHNOLOGY CO., LTD., Guangzhou (CN)

(72) Inventors: Li Liu, Guangzhou (CN); Yue Ma, Guangzhou (CN); Leju Yan, Guangzhou (CN); Qing Liu, Guangzhou (CN)

(73) Assignee: BIGO TECHNOLOGY PTE. LTD., Mapletree Business (SG)

( * ) Notice: Subject to any disclaimer, the term of this patent is extended or adjusted under 35 U.S.C. 154(b) by 0 days.

(21) Appl. No.: 16/764,662

(22) PCT Filed: Nov. 21, 2018

(86) PCT No.: PCT/CN2018/116622
§ 371 (c)(1),
(2) Date: May 15, 2020

(87) PCT Pub. No.: WO2019/101089
PCT Pub. Date: May 31, 2019

(65) Prior Publication Data
US 2020/0404330 A1    Dec. 24, 2020

(30) Foreign Application Priority Data
Nov. 21, 2017 (CN) .......................... 201711165190.2

(51) Int. Cl.
*H04N 11/02* (2006.01)
*H04N 19/61* (2014.01)
(Continued)

(52) U.S. Cl.
CPC ........... *H04N 19/61* (2014.11); *H04N 19/172* (2014.11); *H04N 19/176* (2014.11); *H04N 19/58* (2014.11)

(58) Field of Classification Search
CPC ....................................................... H04N 19/61
(Continued)

(56) References Cited

U.S. PATENT DOCUMENTS

| 10,681,382 B1* | 6/2020 | Brailovskiy | ........... H04N 19/58 |
| 2007/0199011 A1* | 8/2007 | Zhang | .................. H04N 19/124 |
| | | | 725/1 |

(Continued)

FOREIGN PATENT DOCUMENTS

| CN | 101056405 A | 10/2007 |
| CN | 101330619 A | 12/2008 |

(Continued)

OTHER PUBLICATIONS

First office action of Chinese application No. 201711165190.2 dated Jul. 1, 2019.

(Continued)

*Primary Examiner* — Leron Beck
(74) *Attorney, Agent, or Firm* — Dilworth & Barrese, LLP.; Michael J. Musella, Esq.

(57) ABSTRACT

The video sending method includes: acquiring a video stream to be transmitted; generating consecutive frame groups from the video stream, wherein setting a first frame in the current frame group to be a long-term reference frame that uses a first frame in a previous frame group as a reference during generation of at least one of the current frame group, wherein the long-term reference frame is a predictive coded frame configured to transmit a difference and a motion vector obtained by performing a comparison against the first frame in the previous frame group, the (Continued)

current frame group is a frame group other than the first frame group; and sending the frame groups to a receiving terminal. The video receiving method comprises: receiving the frame groups sent by a sending terminal; and restoring the frame groups to obtain the transmitted video stream.

20 Claims, 5 Drawing Sheets

(51) Int. Cl.
    *H04N 19/172*     (2014.01)
    *H04N 19/176*     (2014.01)
    *H04N 19/58*     (2014.01)

(58) Field of Classification Search
    USPC ..................................... 375/240.01–240.29
    See application file for complete search history.

(56) References Cited

U.S. PATENT DOCUMENTS

| | | | |
|---|---|---|---|
| 2008/0247463 A1* | 10/2008 | Buttimer | H04N 19/58 375/240.12 |
| 2009/0220011 A1 | 9/2009 | Kursawe et al. | |
| 2010/0166079 A1* | 7/2010 | Goel | G11B 27/005 375/240.25 |
| 2010/0239000 A1* | 9/2010 | MacDonald | H04N 19/58 375/240.12 |
| 2011/0090957 A1* | 4/2011 | Liao | H04N 19/105 375/240.12 |
| 2014/0321545 A1* | 10/2014 | Wang | H04N 19/164 375/240.15 |

FOREIGN PATENT DOCUMENTS

| | | |
|---|---|---|
| CN | 101360243 A | 2/2009 |
| CN | 102196249 A | 9/2011 |
| CN | 102378008 A | 3/2012 |
| CN | 103874214 A | 6/2014 |
| CN | 105847790 A | 8/2016 |
| CN | 106713913 A | 5/2017 |
| CN | 107333133 A | 11/2017 |
| CN | 107948654 A | 4/2018 |

OTHER PUBLICATIONS

Second office action of Chinese application No. 201711165190.2 dated Dec. 23, 2019.
Extended European search report of counterpart EP application No. 18880466.0 dated Jun. 29, 2020.
Lvcheng Wang, et al; Multimedia Communication Technology, Interframe predictive coding; Jan. 31, 2011, pp. 78-83.
Zhengxin Hou, et al, Principles of Television (7th Edition), Motion compensation inter prediction coding, inter prediction mode; Sep. 30, 2016 , pp. 146-149.
SM Shen et al, Restricted Multiple Long Term Reference Frames, 15. VCEG Meeting; 58. MPEG Meeting Apr. 12, 2001-Jun. 12, 2001; Pattaya,TH; (Video Codi ng Experts Group of ITU-TSG.16), Jan. 4, 2002 (Jan. 4, 2002), section "2 Restricted Multiple Reference Frame with Long Term Frame Buffer", section "2.1 Solution in Picture Level", section "2.2 Solution in Sequence of Group of Pictures Level".
Fan Li et al, ROI-based error resilient coding of H.264 for conversational video communication, Wireless Communications and Mobile Computing Conference (IWCMC), 2011 7th International, IEEE, Jul. 4, 2011 (Jul. 4, 2011), pp. 1719-1723, abstract, section "I. Introduction", section "II. ROI-based error resilient coding scheme".

* cited by examiner

VIDEO SENDING AND RECEIVING METHOD, APPARATUS, AND TERMINAL THEREOF

CROSS-REFERENCE TO RELATED APPLICATION

This application is a National Stage of International Application No. PCT/CN2018/116622, filed on Nov. 21, 2018, the contents of all of which are incorporated herein by reference in their entirety.

TECHNICAL FIELD

The present disclosure relates to the technical field of the Internet, and more particularly to, relates to a video sending and receiving method and apparatus, and a terminal thereof.

BACKGROUND

With constant developments of the Internet technologies, the Internet and applications combined with the Internet technologies have gradually become indispensable in people's lives. Nowadays, people are placing more and more concerns on applications for video transmission over the Internet, such as a videophone, a video conference, and the like. However, due to unreliability of data transmission over the Internet, video frames may not be completely transmitted to a receiving terminal, and loss of a video frame may lead to failure in current and subsequent decoding with reference to this video frame, and further cause lags in displaying video pictures. The video pictures cannot be smoothly displayed until the video frames that are successfully decoded are completely received.

SUMMARY

The present disclosure provides methods, apparatuses, and terminals thereof in the following technical solutions.

The present disclosure provides a video sending method. The method includes the following steps:

acquiring a video stream to be transmitted;

generating consecutive frame groups from the video stream, wherein setting a first frame in a current frame group to be a long-term reference frame that uses a first frame in a previous frame group as a reference during generation of at least one of the current frame; wherein the long-term reference frame is a predictive coded frame configured to transmit a difference value and a motion vector obtained by performing a comparison against the first frame in the previous frame group; the current frame group is a frame group other than the first frame group; and sending the frame groups to a receiving terminal.

In addition, the present disclosure provides a video receiving method corresponding to the above video sending method. The video receiving method includes the following steps:

receiving frame groups sent by a sending terminal according to the video sending method as defined in the embodiments above; and restoring the frame groups to obtain a video stream.

The present disclosure also provides a video sending apparatus. The apparatus includes:

a processor; and a memory for storing instructions executable by the processor, wherein the processor is configured to:

acquire a video stream to be transmitted;

generate consecutive frame groups from the video stream, wherein generating the consecutive frame groups from the video stream includes: setting a first frame in a current frame group to be a long-term reference frame that uses a first frame in a previous frame group as a reference during generation of the current frame group; wherein the long-term reference frame is a predictive coded frame for transmitting a difference value and a motion vector obtained by performing a comparison against the first frame in the previous frame group; and send the frame groups to a receiving terminal.

The present disclosure also provides a video receiving apparatus. The apparatus includes:

a processor; and a memory for storing instructions executable by the processor, wherein the processor is configured to:

receive frame groups sent by a sending terminal according to the video sending method as defined in the embodiments above; and restore the frame groups to a video stream.

The present disclosure further provides a terminal. The terminal includes:

at least one processors;

a memory; and at least one application programs, wherein the at least one application programs are stored in the memory, configured to be executed by the at least one processors, and configured to execute the video sending method as defined in the embodiments above.

The present disclosure further provides another terminal. The terminal includes:

at least one processors;

a memory; and at least one application programs, wherein the at least one application programs are stored in the memory, configured to be executed by the at least one processors, and configured to execute the video receiving method as defined in the embodiments above.

Additional aspects and advantages of the present disclosure will be partly given in the following description, and will be apparent from the following description or be appreciated from the practice of the present disclosure.

BRIEF DESCRIPTION OF THE DRAWINGS

The above and/or additional aspects and advantages of the present disclosure will be apparent and easy to understand from the description of the embodiments with reference to the accompanying drawings below, in the drawings.

DETAILED DESCRIPTION

In order to cope with the unreliability of the Internet-based transmission and shorten lag time of the video pictures, in the conventional art, one video frame is generally sent at multiple times to ensure that the video frame may still reach a receiving terminal even in the case of a high network packet loss rate. In the conventional art, the video pictures may be restored by immediately sending an I frame where a packet is lost.

However, the above conventional art is still defective in that the lag time of the video picture may not be effectively shorten. When one video frame is sent at multiple times, the receiving terminal needs to take one second or even several seconds to completely receive the video frame. No decodable video frame is present during this period, and the video picture may be lagged by one second or several seconds. As the I frame does not need to reference to other video frames and has a data size usually 2 to 3 times of that of an ordinary video frame, it is more likely that transmission time of the I frame is long or fails to be completely transmitted to the receiving terminal in case of a poor network condition. As a result, the video picture is lagged for a longer time.

For application scenarios where real-time video communication is carried out over the Internet, such as a videophone, a video conference, and the like, the network transmission technology usually adopts TCP/IP to achieve communication. However, the 1P network is an unreliable transmission network, and the unreliability of the transmission easily leads to problems of lag and delay of a received video, making the video play not smoothly or in real-time. The real-time video communication such as the videophone or the video conference differs from a video such as a television drama or a movie in that there are fewer changes between video pictures in the real-time video communication, namely the involved scenario switching situations are fewer. The video compression rate may be very high and the number of I frames that need to be set in coding is small, without considering the unreliability in the network transmission. In the conventional art, the I frame serves as the first frame in a group of consecutive pictures (GOP), namely, as a basic frame that carries full-frame image information. Image quality of the I frame affects image quality of subsequent P and B frames in the GOP. If the I frame is lost during video transmission, the video picture may be lagged and may not be restored before a next GOP is started. Therefore, in real-time video communication applications, in order to reduce the I frame loss caused by the instability of the network, the length of the GOP is usually configured to be small, which is equivalent to providing enough I frames in a coded frame sequence. However, as the data size of the I frame is larger, the multiple I frames increase bandwidth and network load, resulting in slower transmission speed and a lower transmission success rate. Thus, smoothness and real-time performance of the transmitted video cannot be bettered.

Figure 1:
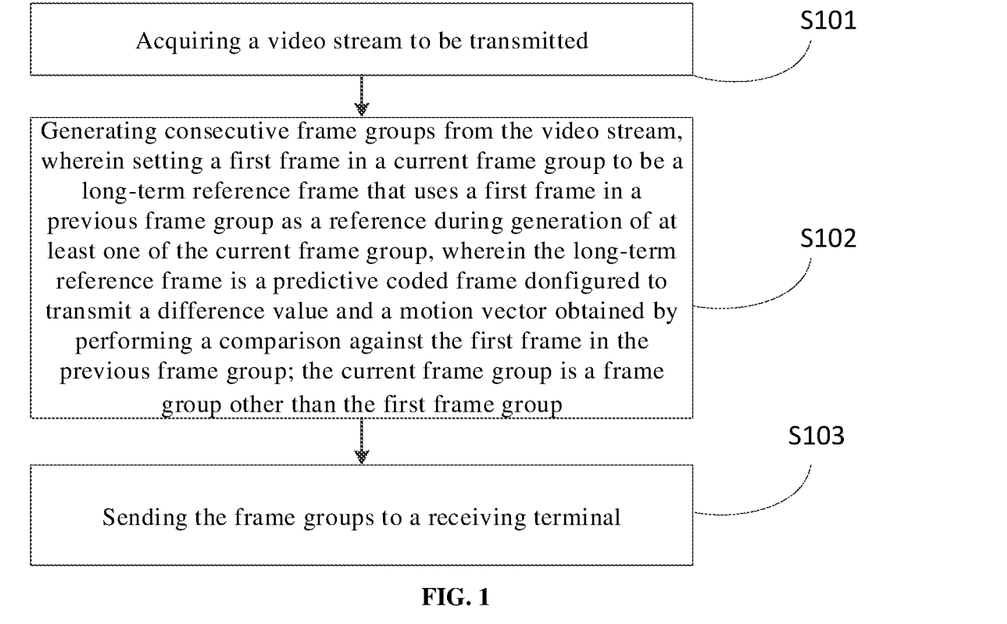
FIG. 1 is a flowchart of a video sending method according to a first embodiment of the present disclosure.

In view of the above problems, the present disclosure provides a video sending method. FIG. 1 is a flowchart of a video sending method according to a first embodiment of the present disclosure. The video sending method includes the following steps.

In step S101, a video stream to be transmitted is acquired.

The video stream to be transmitted by a user is acquired in a scenario where the user carries out real-time video communication over the Internet.

In step S102, consecutive frame groups are generated from the video stream, wherein a first frame in a current frame group is set to be a long-term reference frame that uses a first frame in a previous frame group as a reference during generation of at least one of the current frame group; and the long-term reference frame is a predictive coded frame for configured to transmit a difference value and a motion vector obtained by performing a comparison against the first frame in the previous frame group. The current frame group is a frame group other than the first frame group.

Figure 2:
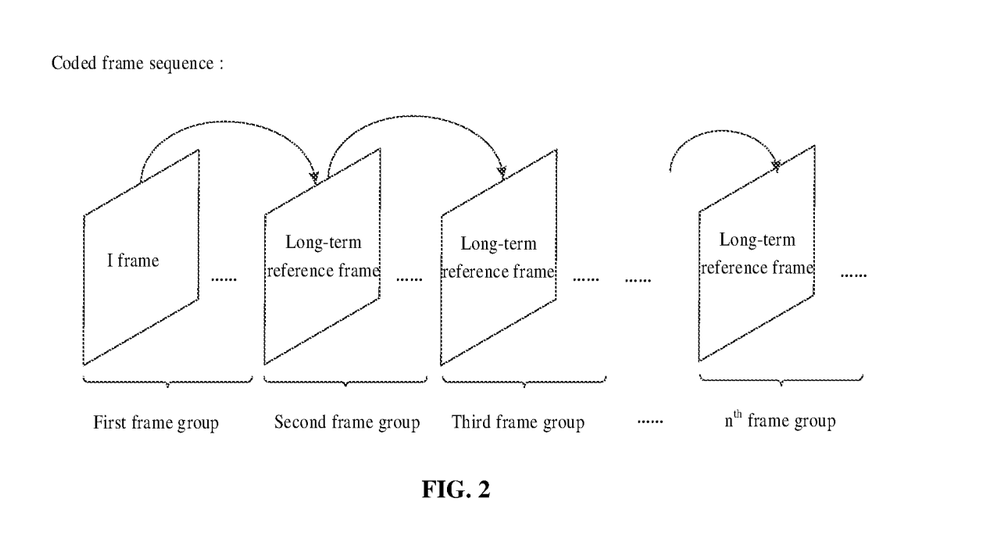
FIG. 2 is a schematic structural diagram of a frame group according to the present disclosure.

Specifically, as shown in FIG. 2, the acquired video stream is compressed and coded. When no scenario switching occurs, a coded frame sequence is coded in a form of multiple consecutive frame groups. The first frame in a first frame group in the coded frame sequence should be set as a basic frame that carries full-frame image information. In the video sending method of the present disclosure, the long-term reference frame set in the first frame in the frame group is defined, and uses the first frame in the previous frame group as the reference, namely uses the I frame or the previous long-term reference frame as the reference. The long-term reference frame is the predictive coded frame for transmitting the difference value and the motion vector obtained by performing a comparison against the first frame in the previous frame group. When scenario switching occurs and each frame may no longer be generated with reference to the I frame, this coded frame sequence is ended, and a new coded frame sequence is started. In addition, in order to meet a function requirement of starting the new coded frame sequence, information for resetting video transmission is preset in data of the I frame.

For example, in the embodiment of the present disclosure, if the number of frames of one frame groups is 11, one long-term reference frame is generated from every 10 frames after the first I frame of this coded frame sequence, such that a plurality of frame groups that use the long-term reference frame as the first frame except the first frame group are obtained.

In step S103, the frame groups are sent to a receiving terminal.

Specifically, the frames in each of the frame groups are sent to the receiving terminal one by one.

In the present disclosure, the long-term reference frame that uses the first frame in the previous frame group as the reference is defined. Compared with the I frame that carries complete image information of the video frame, the long-term reference frame is relatively small in data size, thereby having a shorter transmission time and a higher transmission success rate. Compared with the P frame that uses the previous frame as the reference, although the data size of the long-term reference frame is relatively large, the long-term reference frame can effectively reduce the diffusion of a decoding error. Thus, by using the long-term reference frame to replace the I frame originally used in multiple consecutive frame groups of a video coding sequence when no scenario switching occurs in the prior art, data sizes of frames in each frame group are more uniform, such that transmission delay is shortened, and probability of packet loss is lowered.

Figure 3:
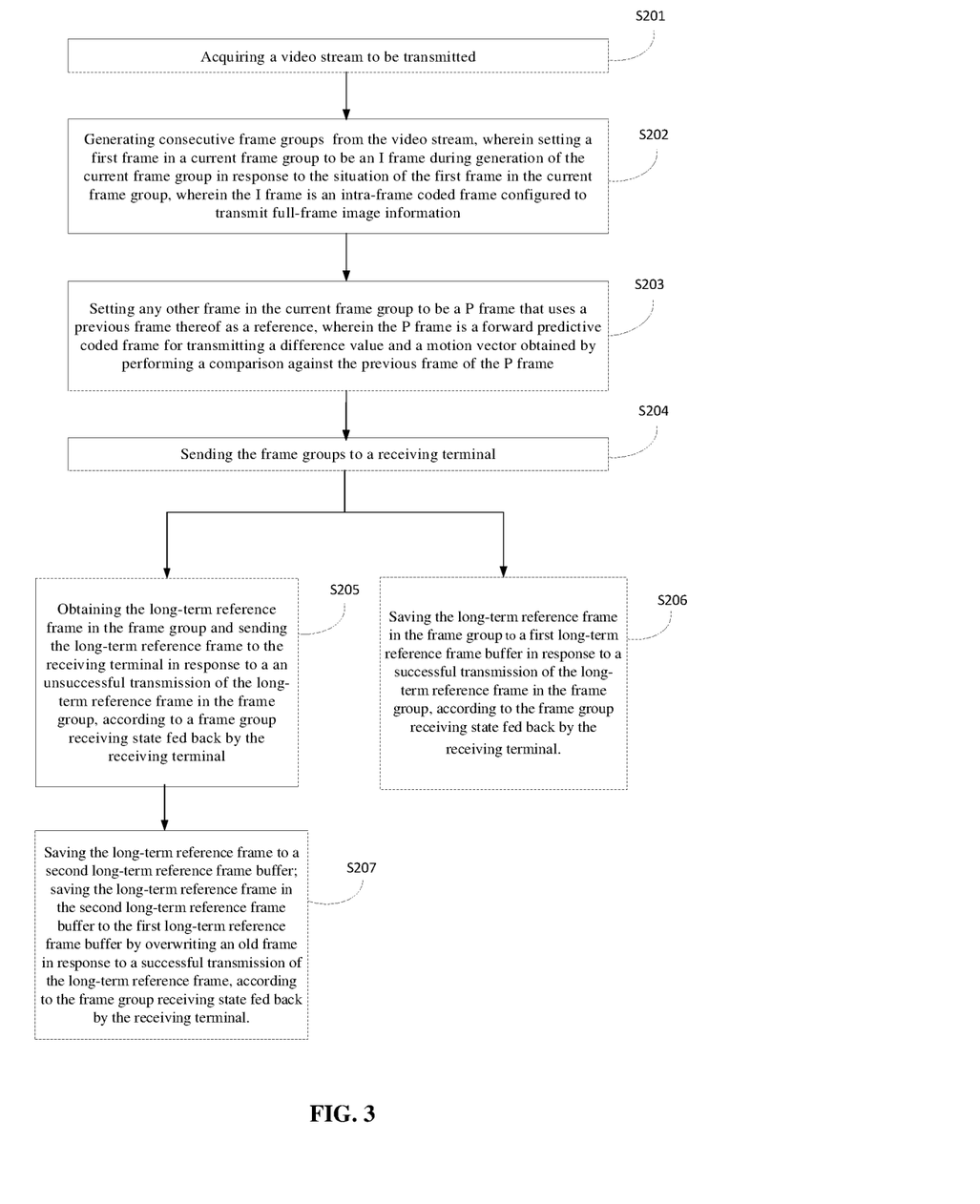
FIG. 3 is a flowchart of a video sending method according to a second embodiment of the present disclosure.

FIG. 2 is a flowchart of a video sending method according to a second, embodiment of the present disclosure. The video sending method includes the following steps.

In step S201, a video stream to be transmitted is acquired.

The video stream to be transmitted by a user is acquired in a scenario where the user uses a network for real-time video communication.

In step S202, consecutive frame groups are generated from the video stream, wherein setting a first frame in a current frame group to be an I frame during generation of at least one of the current frame group in response to the situation of the first frame in the current frame group, wherein the I frame is an intra-frame coded frame configured to transmit full-frame image information.

Specifically, the acquired video stream is compressed and coded. When no scenario switching occurs, a coded frame sequence is coded in a form of multiple consecutive frame groups. As described in step S102, the first frame in a first frame group in the coded frame sequence should be set as a basic I frame that carries full-frame image information. Thus, before generating the first frame in the current frame group, it is required to determine whether the current frame group is the first frame group in the coded frame sequence and whether the first frame in the current frame group needs to be set as the I frame, and the first frame in the Current frame group is set to be the I frame if the current frame group is the first frame group. In the video sending method of the present disclosure, a long-term reference frame set in the first frame in the frame group is defined, which uses a first frame in a previous frame group as a reference, namely uses the I frame or a previous long-term reference frame as a reference, and the long-term reference frame is a predictive coded frame for transmitting a difference value and a motion vector obtained by performing a comparison against the first frame in the previous frame group. If it is determined in step S202 that the first frame does not need to be set as the I frame, the first frame in the current frame group is set to be the long-term reference frame that uses the first frame in the previous frame group as the reference, the coded frame sequence is obtained as shown in FIG. 2. When scenario switching occurs and each frame may no longer be generated with reference to the above I frame, this coded frame sequence is ended, and a new coded frame sequence is started. In addition, in order to meet a function requirement of starting the new coded frame sequence, information for resetting video transmission is preset in data of the I frame.

For example, in the embodiment of the present disclosure, if the number of frames of one frame groups is 11, one long-term reference frame is generated from every 10 frames after the first I frame of this coded frame sequence, such that a plurality of frame groups that use the long-term reference frame as the first frame except the first frame group are obtained.

In step S203, any other frame in the current frame group is set to be a P frame that uses a previous frame thereof as a reference, wherein the P frame is a forward predictive coded frame for transmitting a difference value and a motion vector obtained by performing a comparison against the previous frame of the P frame.

Specifically, after the first frame in the current frame group is generated, any other frame in the current frame group is set to be the P frame that uses the previous frame thereof as the reference, wherein the P frame is the forward predictive coded frame for transmitting the difference value and the motion vector obtained by performing a comparison against the previous frame of the P frame. For example, in the embodiment of the present disclosure, if the number of frames of one frame groups is 11, the frame group is composed of one I frame or long-term reference frame as a first frame and 10 consecutive P frames.

In the embodiment of the present disclosure, each frame in the frame group includes identification information of one byte (eight bits). The identification information may be set at the head or tail of the frame according to a coding rule. In the identification information, the eight bits are set as a, b, c, d, e, f, g, and h bits according to an order of the eight bits of one byte. The meaning of each bit is defined as follows.

The a bit is a bit that has the highest priority, and is configured to define a type of a frame. In the embodiment of the present disclosure, frame types include the above intra-frame coded frame, namely I frame, a forward predictive coded frame, namely P frame, and a long-term reference frame defined in the present disclosure. In the identification information, when a bit of the identification information is 0, it means that the frame is the I frame or the P frame, or when the a bit is 1, it means that the frame is the long-term reference frame.

The b bit is configured to define a fashion in which the frame refreshes a long-term reference frame buffer when a is 1. In the embodiment of the present disclosure, both the video sending terminal and the video receiving terminal are provided with a long-term reference frame buffer for saving a long-term reference frame. Two fashions are available for refreshing the long-term reference frame buffer. One is emptying, namely, emptying the long-term reference frame buffer; and the other is overwriting an old frame, that is, saving a current frame, in place of a frame that has been saved in the long-term reference frame buffer, to the long-term reference frame buffer. If the b bit of the identification information is 0, it indicates that the long-term reference frame buffer is emptied by emptying, or if the b bit is 1, it indicates that the long-term reference frame buffer is refreshed by overwriting the old frame.

The c, d, e, f, and g bits are configured to save information related to frame numbers, and are specifically configured to save last five bits of a frame number of a previous long-term reference frame referenced by a current long-term reference frame. That is, the c to g bits in the identification information of the long-term reference frame in the current reference frame group save the last five bits of the frame number of the previous long-term reference frame referenced by the long-term reference frame in the current reference frame group.

The h bit is set to be a reserved bit.

By adding the identification information on each frame, the video sending method can still implement video transmission smoothly after a newly defined long-term reference frame is set in a frame group.

In another implementation, the coded frame sequence may further include a bidirectionally predictive coded frame, namely B frame, which uses its previous and next non-B frames as a reference. However, this implementation is not a preferred embodiment of the video sending method in the present disclosure, and has its limitations as follows. If the B frame is added to the coded sequence, decoding delay may be shortened to some extent, because the frame after the B frame is required in coding and decoding of the 13 frame, thereby adversely affecting the real-time performance of the real-time video communication.

In step S204, the frame groups are sent to a receiving terminal.

Specifically, the frames in each frame group are sent to the receiving terminal one by one.

In step S205, the long-term reference frame is obtained in the frame group and the long-term reference frame is sent to the receiving terminal, in response to an unsuccessful transmission of the long-term reference frame in the frame group, according to a frame group receiving state fed back by the receiving terminal.

In step S206, the long-term reference frame in the frame group is saved to a first long-term reference frame buffer, in response to a successful transmission of the long-term reference frame in the frame group, according to a frame group receiving state fed back by the receiving terminal. In step S207, the long-term reference frame is saved to a second long-term reference frame buffer; and the long-term reference frame in the second long-term reference frame buffer is saved to the first long-term reference frame buffer by overwriting an old frame, in response to a successful transmission of the long-term reference frame, according to the frame group receiving state fed back by the receiving terminal.

Step S205 is repeated, in response to an unsuccessful transmission of the long-term reference frame.

Due, to the unreliability in network transmission, packet loss or abnormal transmission may occur during the video transmission. In the embodiment of the present disclosure, the video sending terminal receives the frame group receiving state fed back by the video receiving terminal. For example, the video sending terminal receives the frame group receiving state fed back by the video receiving terminal every 200 ms. If the frame group receiving state indicates packet loss, a long-term reference frame in a frame group corresponding to the frame group receiving state needs to be generated immediately, such that the receiving terminal starts decoding immediately and restoring the video picture after receiving the long-term reference frame.

In the video sending method of the present disclosure, a long-term reference frame buffer for saving a successfully-transmitted long-term reference frame is further configured at the video sending terminal. The long-term reference frame buffer is a ping-pong buffer. The so-called ping-pong buffer defines two buffers. When data is input, a process responsible for writing in the data to the buffer searches for a first unoccupied and writable buffer and writes the data therein. After writing is completed, an occupied flag is released; and meanwhile, a flag is intended to indicate that the buffer is writable. Then, another unoccupied and writable buffer is searched to write new data therein. When new data is input again, one of the writable buffers is selected, and the old data, is replaced with the new data. The first long-term reference frame buffer and the second long-term reference frame buffer mentioned in the above steps adopt a working principle of the above ping-pong buffer when implementing the video sending method of the present disclosure. The first long-term reference frame buffer is configured to save a previous successfully-transmitted long-term reference frame, the second long-term reference frame buffer is configured to save a long-term reference frame that is generated by the sending terminal in real time when the packet loss occurs. After a frame group receiving state that indicates successful transmission of the above real-time generated long-term reference frame fed back by the receiving terminal is received, the long-term reference frame is regarded as the previous successfully-transmitted long-term reference frame, and the long-term reference frame replaces a long-term reference frame previously saved in the first long-term reference frame buffer. If the transmission of the real-time generated long-term reference frame is not successful, the long-term reference frame needs to be sent again.

The long-term reference frame buffers are configured in the sending terminal, such that the long-term reference frame can be cached to ensure that a corresponding long-term reference frame can be sent in time when packet loss occurs, and lag time of a video picture is effectively shortened, such that the video is played smoothly and in real-time.

In the embodiment of the present disclosure, in order to ensure that the long-term reference frame can be saved to the long-term reference frame buffer of the sending terminal according to the working principle of the ping-pong buffer, the b bit in the identification information of the long-term reference frame is preset to be 1, namely the long-term reference frame buffer is refreshed by overwriting the old frame.

In the present disclosure, the long-term reference frame that uses the first frame in the previous frame group as the reference is defined. Compared with the I frame that carries complete image information of the video frame, the long-term reference frame is relatively small in data size, thereby having a shorter transmission time and a higher transmission success rate. Compared with the P frame that uses the previous frame as the reference, although the data size of the long-term reference frame is relatively large, the long-term reference frame can effectively reduce the diffusion of a decoding error. Thus, by using the long-term reference frame to replace the I frame originally used in multiple consecutive frame groups of a video coding sequence when no scenario switching occurs in the prior art, data sizes of frames in each frame group are more uniform, such that transmission delay is shortened, and probability of packet loss is lowered. When packet loss occurs during video transmission, a long-term reference frame may be generated in real time to shorten a blocking time of a video picture when the receiving terminal restores the video, such that the video is played smoothly and in real-time.

Figure 4:
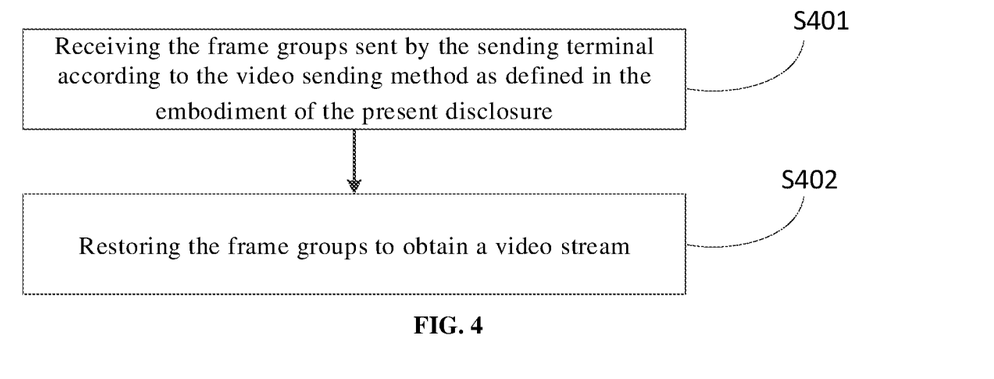
FIG. 4 is a flowchart of a video receiving method according to a first embodiment of the present disclosure.

Accordingly, as shown in FIG. 4, the present disclosure further includes a video receiving method, including the following steps.

In step S401, the frame groups sent by the sending terminal according to the video sending method as defined in the first embodiment or the second embodiment of the present disclosure are received.

In step S402, the frame groups are restored to obtain a video stream.

Specifically, frames in each of the frame groups sent by the sending terminal one by one are received, the received frames are decoded and restored to obtain the video stream to be transmitted. The frame groups and the frames in each of the frame groups are the same as those in the video sending method according to the first embodiment and those in steps S202 to S205 in the video sending method according to the second embodiment, and are not described in detail herein.

In the present disclosure, the long-term reference frame that uses the first frame in the previous frame group as the reference is defined. Compared with the I frame that carries complete image information of the video frame, the long-term reference frame is relatively small in data size, thereby having a shorter transmission time and a higher transmission success rate. Compared with the P frame that uses the previous frame as the reference, although the data size of the long-term reference frame is relatively large, the long-term reference frame can effectively reduce the diffusion of a decoding error. Thus, by using the long-term reference frame to replace the I frame originally used in multiple consecutive frame groups of a video coding sequence when no scenario switching occurs in the prior art, data sizes of frames in each frame group are more uniform, such that transmission delay is shortened, and probability of packet loss is lowered.

Figure 5:
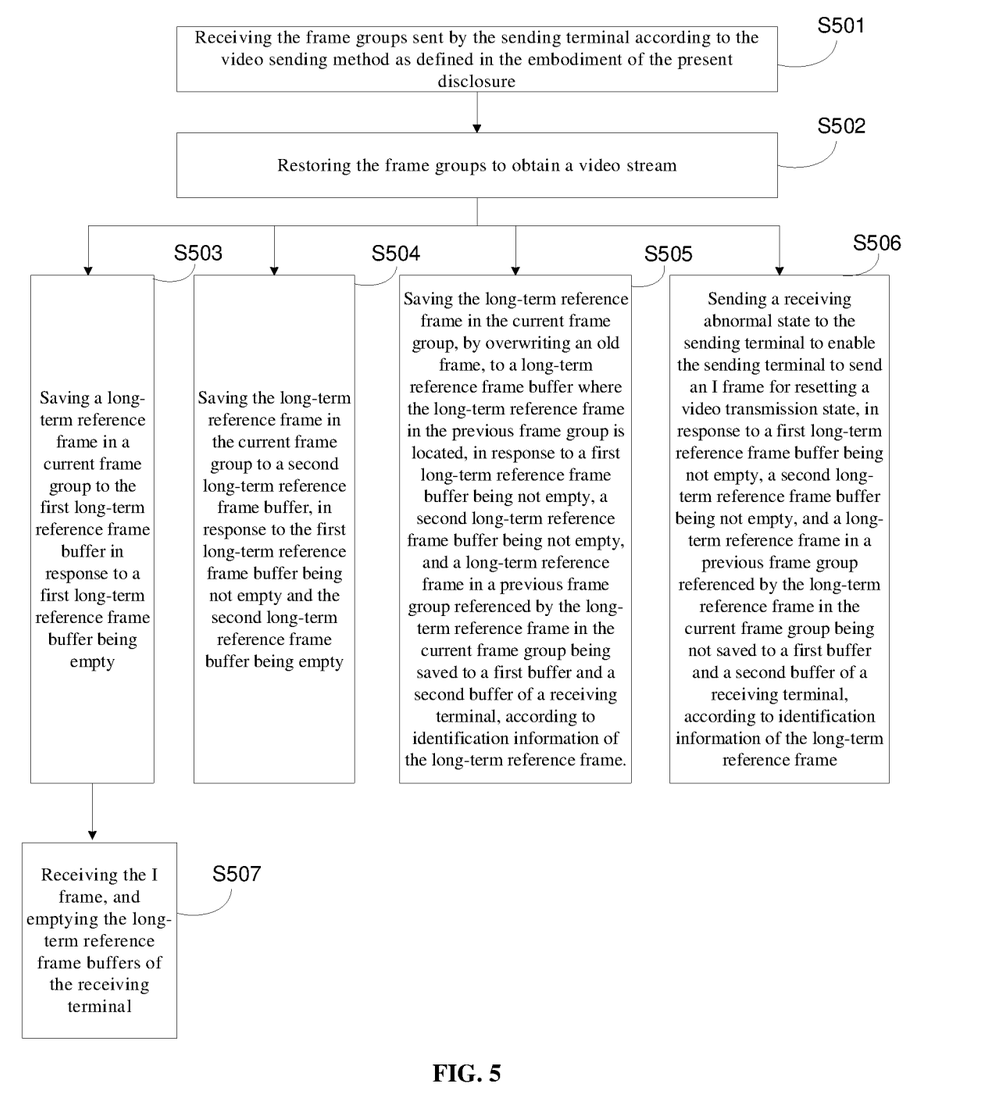
FIG. 5 is a flowchart of a video receiving method according to a second embodiment of the present disclosure.

FIG. 5 is a flowchart of a video receiving method according to a second embodiment of the present disclosure. The video receiving method includes the following steps.

In step S501, the frame groups sent by the sending terminal according to the video sending method of the first embodiment or the second embodiment of the present disclosure are received.

In step S502, the frame groups are restored to obtain a video stream.

Specifically, frames in each of the frame groups sent by the sending terminal one by one are received, the received frames are recoded and restored to obtain the video stream to be transmitted. The frame groups and the frames in each of the frame groups are the same as those in the video sending method according to the first embodiment and those in steps S202 to S203 in the video sending method according to the second embodiment, and are not described in detail herein.

In step S503, a long-term reference frame a current frame group is saved in a current frame group to the first long-term reference frame buffer in response to a first long-term reference frame buffer being empty.

In step S504, the long-term reference frame in the current frame group is saved to a second long-term reference frame buffer, in response to the first long-term reference frame buffer being not empty and the second long-term reference frame buffer being empty.

In step S505, the long-term reference frame in the current frame group is saved by overwriting an old frame, to a long-term reference frame buffer where the long-term reference frame in the previous frame group is located, in response to a first long-term reference frame buffer being not empty, a second long-term reference frame buffer being not empty, and a long-term reference frame in a previous frame group referenced by the long-term reference frame in the current frame group being saved to a first buffer and a second buffer of a receiving terminal, according to identification information of the long-term reference frame.

In step S508, a receiving abnormal state is sent to the sending terminal to enable the sending terminal to send an I frame for resetting a video transmission state, in response to a first long-term reference frame buffer being not empty, a second long-term reference frame buffer being not empty, and a long-term reference frame in a previous frame group referenced by the long-term reference frame in the current frame group being not saved to a first buffer and a second buffer of a receiving terminal, according to identification information of the long-term reference frame.

Specifically, the long-term reference frame buffer is processed by the receiving terminal in steps S503 to S506; and the processing is the same as the working principle of the long-term reference frame buffer of the sending terminal. The long-term reference frame buffer is a ping-pong buffer. The so-called ping-pong buffer defines two buffers. When data is input, a process responsible for writing in the data to the buffer searches for a first unoccupied and writable buffer and writes the data therein. After writing is completed, an occupied flag is released; and meanwhile, a flag is intended to indicate that the buffer is writable. Then, another unoccupied and writable buffer is searched to write new data therein. When new data is input again, one of the writable buffers is selected, and the old data is replaced with the new data. The first long-term reference frame buffer and the second long-term reference frame buffer mentioned in the above steps adopt a working principle of the above ping-pong buffer when implementing the video receiving method of the present disclosure. When in an initial state of video transmission, the receiving terminal has not yet received the first long-term reference frame sent by the sending terminal. Thus, at this time, the two long-term reference frame buffers of the receiving terminal are empty. When the video receiving terminal receives the first long-term reference frame sent by the sending terminal, the long-term reference frame is saved to one of the long-term reference frame buffers, which is defined as the first long-term reference frame buffer in the embodiment of the present disclosure. The other long-term reference frame buffer, namely, the second long-term reference frame buffer defined in the embodiment of the present disclosure, is empty. When the video receiving terminal receives the second long-term reference frame sent by the sending terminal, the long-term reference frame is saved in the other long-term reference frame, namely, the above second long-term reference frame buffer. When the two long-term reference frame buffers are occupied and the receiving terminal receives another long-term reference frame, the c to g bits in the identification bits of the long-term reference frame need to be acquired to determine whether the two long-term reference frame buffers save a long-term reference frame with last 5 bits of the frame number being the same as the c to g bits in the identification bits of the long-term reference frame. If any, the currently received long-term reference frame replaces the long-term reference frame referenced by the currently received long-term reference frame, and is saved to the corresponding long-term reference frame buffer; if the long-term reference frame referenced by the current long-term reference frame is not found in the long-term reference frame buffers, it is determined that there is an abnormality in the video transmission, and the receiving abnormal state is sent to the receiving terminal.

The video receiving method of the present disclosure can realize caching of the received long-term reference by configuring the long-term reference frame buffers at the receiving terminal, and may detect the abnormal condition of video transmission in time and then take countermeasures by comparing the currently received long-term reference frame with the long-term reference frame saved in the long-term reference frame buffer, such that lag time of a video picture is effectively shortened. In this way, the video is played smoothly and in real-time.

In step S507, the I frame is received, and the long-term reference frame buffers of the receiving terminal are emptied.

Specifically, the I frame sent by the sending terminal is received, and the long-term reference frame buffers of the receiving terminal are emptied according to information which indicates resetting the video transmission and is carried by the I frame, wherein the long-term reference frame buffers include the first reference frame buffer and the second reference frame buffer at the receiving terminal.

In the present disclosure, the long-term reference frame that uses the first frame in the previous frame group as the reference is defined. Compared with the I frame that carries complete image information of the video frame, the long-term reference frame is relatively small in data size, thereby having a shorter transmission time and a higher transmission success rate. Compared with the P frame that uses the previous frame as the reference, although the data size of the long-term reference frame is relatively large, the long-term reference frame may effectively reduce the diffusion of a decoding error. Thus, by using the long-term reference frame to replace the I frame originally used in multiple consecutive frame groups of the video coding sequence when no scenario switching occurs in the prior art, data sizes of frames in each frame group are more uniform, such that transmission delay is shortened, and probability of packet loss is lowered. When packet loss occurs during video transmission, the long-term reference frame may be generated in real time to shorten a blocking time period of a video picture when the receiving terminal restores the video, such that the video is played smoothly and in real-time.

The present disclosure further provides a video sending apparatus. The apparatus includes:

a processor; and a memory for storing instructions executable by the processor, wherein the processor is configured to:

acquire a video stream to be transmitted;

generate consecutive frame groups from the video stream, wherein setting a first frame in a current frame group to be a long-term reference frame that uses a first frame in a previous frame group as a reference during generation of at least one of the current frame group; wherein the long-term reference frame is a predictive coded frame configured to transmit a difference value and a motion vector obtained by performing a comparison against the first frame in the previous frame group; the current frame group is a frame group other than the first frame group; and send the frame groups to a receiving terminal.

Optionally, the processor is further configured to:

set the first frame in the current frame group to be an I frame in response to the situation of the first frame in the current frame group, wherein the I frame is an intra-frame coded frame configured to transmit full-frame image information; and set the first frame in the current frame group to be the i frame if the first frame needs to be set as the I frame, or continue the step of setting the first frame in the current frame group to be the long-term reference frame that uses the first frame in the previous frame group as the reference if the first frame does not need to be set as the I frame.

Optionally, the processor is further configured to:

set any other frame in the current frame group to be a P frame that uses a previous frame thereof as a reference after setting the first frame in the current frame group to be the long-term reference frame that uses the first frame in the previous frame group as the reference, wherein the P frame is a forward predictive coded frame for transmitting a difference value and a motion vector obtained by performing a comparison against the previous frame of the P frame.

Optionally, each frame in the frame group includes identification information of one byte, and the identification information includes:

defining eight bits to be an a bit, a h bit, a c bit, a d hit, an e bit, an f bit, a g bit, and an h bit according to an order of the eight bits of one byte;

the a bit is configured to define a type of a frame; the frame is the I frame or the P frame if a is 0, or the frame is the long-term reference frame if a is 1;

the b bit is configured to define a manner for the frame to refresh a long-term reference frame buffer when a is 1; the long-term reference frame buffer is emptied by emptying if b is 0, or the long-term reference frame buffer is refreshed by overwriting an old frame if b is 1;

the c, d, e, and g bits are configured to save last five bits of a frame number of a previous long-term reference frame referenced by a current long-term reference frame; and the h bit is set as a reserved bit.

Optionally, the processor is further configured to:

save the long-term reference frame in the frame group to a first long-term reference frame buffer in response to a successful transmission of the long-term reference frame in the frame group, according to the frame group receiving state fed back by the receiving terminal.

determine whether transmission of the long-term reference frame in the frame group is successful according to a frame group receiving state fed back by the receiving terminal after sending the frame groups to the receiving terminal; and save the long-term reference frame in the frame group to a first long-term reference frame buffer if the transmission is successful.

Optionally, the processor is further configured to:

obtain the long-term reference frame in the frame group and send the long-term reference frame to the receiving terminal in response to an unsuccessful transmission of the long-term reference frame in the frame group, according to a frame group receiving state fed back by the receiving terminal.

Optionally, the processor is further configured to:

save the long-term reference frame to a second long-term reference frame buffer after sending the long-term reference frame to the receiving terminal;

save the long-term reference frame in the second long-term reference frame buffer to the first long-term reference frame buffer by overwriting an old frame in response to a successful transmission of the long-term reference frame, according to the frame group receiving state fed back by the receiving terminal.

In the present disclosure, the long-term reference frame that uses the first frame in the previous frame group as the reference is defined. Compared with the I frame that carries complete image information of the video frame, the long-term reference frame is relatively small in data size, thereby having a shorter transmission time and a higher transmission success rate. Compared with the P frame that uses the previous frame as the reference, although the data size of the long-term reference frame is relatively large, the long-term reference frame can effectively reduce the diffusion of a decoding error. Thus, by using the long-term reference frame to replace the I frame originally used in multiple consecutive frame groups of the video coding sequence when no scenario switching occurs in the prior art, data sizes of frames in each frame group are more uniform, such that transmission delay is shortened, and probability of packet loss is lowered. When packet loss occurs during video transmission, the long-term reference frame can be generated in real time to shorten a blocking time period of a video picture when the receiving terminal restores the video, such that the video is played smoothly and in real-time.

The present disclosure further provides a video receiving apparatus. The apparatus includes:

a processor; and a memory for storing instructions executable by the processor, wherein the processor is configured to:

receive frame groups sent by a sending terminal according to the video sending method of any one of the above embodiments; and restore the frame groups to obtain a video stream.

Optionally, the processor is further configured to:

save a long-term reference frame in a current frame group to the first long-term reference frame buffer in response to a first long-term reference frame buffer being empty.

Optionally, the processor is further configured to:

save the long-term reference frame in the current frame group to a second long-term reference frame buffer, in response to the first long-term reference frame buffer being not empty and the second long-term reference frame buffer being empty.

Optionally, the processor is further configured to:

save the long-term reference frame in the current frame group, by overwriting an old frame, to a long-term reference frame buffer where the long-term reference frame in the previous frame group is located, in response to a first long-term reference frame buffer being not empty, a second long-term reference frame buffer being not empty, and a long-term reference frame in a previous frame group referenced by the long-term reference frame in the current frame group being saved to a first buffer and a second buffer of a receiving terminal, according to identification information of the long-term reference frame.

Optionally, the processor is further configured to:

send a receiving abnormal state to the sending terminal to enable the sending terminal to send an I frame for resetting a video transmission state, in response to a first long-term reference frame buffer being not empty, a second long-term reference frame buffer being not empty, and a long-term reference frame in a previous frame group referenced by the long-term reference frame in the current frame group being not saved to a first buffer and a second buffer of a receiving terminal, according to identification information of the long-term reference frame.

Optionally, the processor is further configured to:

receive the I frame, and empty the long-term reference frame buffers of the receiving terminal.

In the present disclosure, the long-term reference frame that uses the first frame in the previous frame group as the reference is defined. Compared with the I frame that carries complete image information of the video frame, the long-term reference frame is relatively small in data size, thereby having a shorter transmission time and a higher transmission success rate. Compared with the P frame that uses the previous frame as the reference, although the data size of the long-term reference frame is relatively large, the long-term reference frame can effectively reduce the diffusion of a decoding error. Thus, by using the long-term reference frame to replace the I frame originally used in multiple consecutive frame groups of the video coding sequence when no scenario switching occurs in the prior art, data sizes of frames in each frame group are more uniform, such that transmission delay is shortened, and probability of packet loss is lowered. When packet loss occurs during video transmission, the long-term reference frame may be generated in real time to shorten a blocking time period of a video picture when the receiving terminal restores the video, ensuring smooth and real-time playback of the video.

Figure 6:
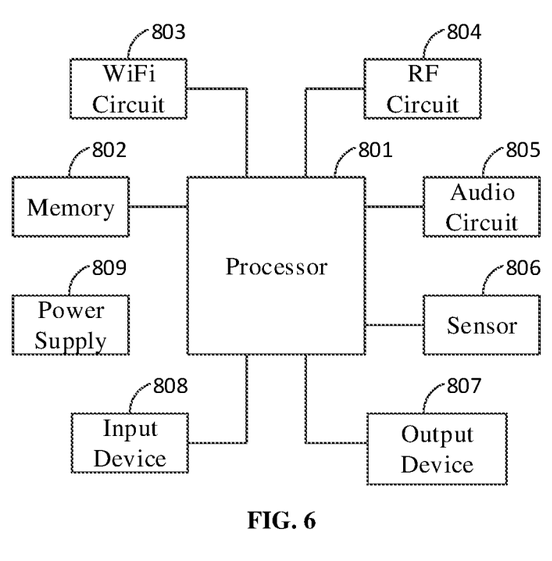
FIG. 6 is a schematic structural diagram of a terminal according to the present disclosure.

FIG. 8 is a schematic structural diagram of a terminal according to the present disclosure. The terminal in the embodiments of the present disclosure may include one or more processors 801, a memory 802, a wireless fidelity (Wi-Fi) circuit 803, a radio frequency (RF) circuit 804, an audio circuit 805, a sensor 806, an output device 807, an input device 804 and a power source 809. The processor 801 is the control center of the terminal and is connected to the above components via various interfaces and lines. It can be understood by those skilled in the art that the terminal structure shown in FIG. 8 is not a limitation to the terminal. The terminal may include more or fewer components than those in FIG. 8, a combination of some components or different component layouts.

The Wi-Fi circuit 803 may provide wireless local area network or Internet access and may include an antenna, a Wi-Fi module and the like. The RF circuit 804 may receive and send information or receive and send signals during a call process. The RF circuit 804 may include an antenna, at least one amplifier, a tuner, one or more oscillator, coupler, duplexer and the like. The audio circuit 805 may convert received audio data into electrical signals and transmit the same to a speaker, and may convert sound signals collected by a microphone into audio data and transmit the same to the processor 801 for processing. The audio circuit 805 may be provided with a speaker, a microphone, an earphone interface, and the like. The sensor 806 may be configured to sense external signals and send the same to the processor 801 for processing. The sensor 806 may include a motion sensor, an optical sensor and the like. The output device 807 may be configured to display various signals. A display panel may be configured using a liquid crystal display, an organic light-emitting diode or the like. The input device 804 may be configured to input numbers and characters and the like, and may be a physical key, a touch panel or the like. The power source 809 may supply power to the various parts of the terminal, and is logically connected to the processor 809 via a power source management system, and may include one or more DC or AC power sources, charging systems, power source status indicator and the like. The memory 802 may be configured to store applications and modules, and may be a computer-readable storage medium, such as a hard disk, a flash memory, and the like. The processor is the control center of the terminal, implements various functions of the terminal and processes terminal data by operating or executing the software programs and/or modules stored in the memory 802 and calling the data stored in the memory 802.

As an embodiment, as shown in FIG. 6, the terminal includes one or more processors 801, a memory 802 and one or more applications. The one or more applications are stored in the memory 802, are configured to be executed by the one or more processors 801, and are configured to execute the above-mentioned video sending methods provided by the first and second embodiments of the present disclosure.

As an embodiment, as shown in FIG. 6, the terminal includes one or more processors 801, a memory 802 and one or more applications. The one or more applications are stored in the memory 802, are configured to be executed by the one or more processors 801, and are configured to execute the above-mentioned video receiving methods provided by the first and second embodiments of the present disclosure.

In addition, all functional units in the embodiments of the present disclosure may be integrated into one processing module, or each of the units exists physically and independently, or two or more of the units may be integrated into one module. The above integrated modules may be implemented in the form of hardware or a software functional module. If implemented in the form of the software functional module and sold or used as a stand-alone product, the integrated modules may be stored in a computer-readable storage medium. The foregoing storage medium may be a read-only memory (ROM), a magnetic disk, an optical disk or the like.

The above description is only some embodiments of the present disclosure, and it should be noted that those skilled in the art may also make several improvements and modifications without departing from the principles of the present disclosure which should be considered as the scope of protection of the present disclosure.

The invention claimed is:

1. A video sending method, comprising:
acquiring a video stream to be transmitted;
generating consecutive frame groups from the video stream, wherein setting a first frame in a current frame group to be a long-term reference frame that uses a first frame in a previous frame group as a reference during generation of at least one of the current frame group; wherein the long-term reference frame is a predictive coded frame configured to transmit a difference value and a motion vector obtained by performing a comparison against the first frame in the previous frame group; the current frame group is a frame group other than the first frame group; and sending the frame groups to a receiving terminal, wherein each frame in the frame group comprises identification information of one byte, and the identification information comprises:

configuring eight bits to be an a bit, a b bit, a c bit, a d bit, an e bit, an f bit, a g bit, and an h bit according to an order of the eight bits of one byte, wherein a bit is configured to define a type of a frame; the frame is an one of I frame and a P frame if a is 0, the frame is the long-term reference frame if a is 1;

the b bit is configured to define a manner for the frame to refresh a long-term reference frame buffer when a is 1; the long-term reference frame buffer is emptied by emptying if b is 0, the long-term reference frame buffer is refreshed by overwriting an old frame if b is 1;

the c, d, e, f, and g bits are configured to save last five bits of a frame number of a previous long-term reference frame referenced by a current long-term reference frame; and the h bit is set as a reserved bit.

2. The video sending method of claim 1, wherein before setting the first frame in the current frame group to be the long-term reference frame that uses the first frame in the previous frame group as the reference, the method further comprises:

setting the first frame in the current frame group to be an I frame in response to the situation of the first frame in the current frame group, wherein the I frame is an intra-frame coded frame configured to transmit full-frame image information.

3. The video sending method of claim 1, wherein after setting the first frame in the current frame group to be the long-term reference frame that uses the first frame in the previous frame group as the reference, the method further comprises:

setting any other frame in the current frame group to be a P frame that uses a previous frame thereof as a reference, wherein the P frame is a forward predictive coded frame for transmitting a difference value and a motion vector obtained by performing a comparison against the previous frame of the P frame.

4. The video sending method of claim 1, wherein after sending the frame groups to the receiving terminal, the method further comprises:

obtaining the long-term reference frame in the frame group and sending the long-term reference frame to the receiving terminal in response to an unsuccessful transmission of the long-term reference frame in the frame group, according to a frame group receiving state fed back by the receiving terminal.

5. The video sending method of claim 1, wherein after sending the frame groups to the receiving terminal, the method further comprises:

saving the long-term reference frame in the frame group to a first long-term reference frame buffer in response to a successful transmission of the long-term reference frame in the frame group, according to the frame group receiving state fed back by the receiving terminal.

6. The video sending method of claim 4, wherein after sending the long-term reference frame to the receiving terminal, the method further comprises:

saving the long-term reference frame to a second long-term reference frame buffer;

saving the long-term reference frame in the second long-term reference frame buffer to the first long-term reference frame buffer by overwriting an old frame in response to a successful transmission of the long-term reference frame, according to the frame group receiving state fed back by the receiving terminal.

7. A video receiving method, comprising:

receiving frame groups sent by a sending terminal according to the video sending method as defined in claim 1; and restoring the frame groups to obtain a video stream.

8. The video receiving method of claim 7, wherein after receiving the frame groups sent by the sending terminal, the method further comprises:

saving a long-term reference frame in a current frame group to the first long-term reference frame buffer in response to a first long-term reference frame buffer being empty.

9. The video receiving method of claim 8, wherein after sending the receiving abnormal state to the sending terminal to enable the sending terminal to send the I frame for resetting the video transmission state, the method further comprises:

receiving the I frame, and emptying the long-term reference frame buffers of the receiving terminal.

10. A video sending apparatus, comprising:

a processor; and a memory for storing instructions executable by the processor, wherein the processor is configured to:

acquire a video stream to be transmitted;

generate consecutive frame groups from the video stream, wherein setting a first frame in a current frame group to be a long-term reference frame that uses a first frame in a previous frame group as a reference during generation of at least one of the current frame group; wherein the long-term reference frame is a predictive coded frame configured to transmit a difference value and a motion vector obtained by performing a comparison against the first frame in the previous frame group; the current frame group is a frame group other than the first frame group; and send the frame groups to a receiving terminal, wherein each frame in the frame group comprises identification information of one byte, and the identification information comprises:

configuring eight bits to be an a bit, a b bit, a c bit, a d bit, an e bit, an f bit, a g bit, and an h bit according to an order of the eight bits of one byte, wherein a bit is configured to define a type of a frame; the frame is an one of I frame and a P frame if a is 0, the frame is the long-term reference frame if a is 1;

the b bit is configured to define a manner for the frame to refresh a long-term reference frame buffer when a is 1; the long-term reference frame buffer is emptied by emptying if b is 0, the long-term reference frame buffer is refreshed by overwriting an old frame if b is 1;

the c, d, e, f, and g bits are configured to save last five bits of a frame number of a previous long-term reference frame referenced by a current long-term reference frame; and the h bit is set as a reserved bit.

11. A video receiving apparatus, comprising:

a processor; and a memory for storing instructions executable by the processor, wherein the processor is configured to:

receive frame groups sent by a sending terminal according to the video sending method as defined in claim 1; and restore the frame groups to obtain a video stream.

12. A terminal, comprising:
at least one processors;
a memory; and
at least one applications, wherein the at least one applications are stored in the memory, configured to be executed by the at least one processors, and configured to perform the video sending method as defined in claim 1.

13. A terminal, comprising:
at least one processors;
a memory; and
at least one applications, wherein the at least one applications are stored in the memory, configured to be executed by the at least one processors, and configured to perform the video receiving method as defined in claim 7.

14. The video receiving method of claim 7, wherein after receiving the frame groups sent by the sending terminal, the method further comprises:
saving the long-term reference frame in the current frame group to a second long-term reference frame buffer, in response to the first long-term reference frame buffer being not empty and the second long-term reference frame buffer being empty.

15. The video receiving method of claim 7, after receiving the frame groups sent by the sending terminal, the method further comprises:
saving the long-term reference frame in the current frame group, by overwriting an old frame, to a long-term reference frame buffer where the long-term reference frame in the previous frame group is located, in response to a first long-term reference frame buffer being not empty, a second long-term reference frame buffer being not empty, and a long-term reference frame in a previous frame group referenced by the long-term reference frame in the current frame group being saved to a first buffer and a second buffer of a receiving terminal, according to identification information of the long-term reference frame.

16. The video receiving method of claim 7, after receiving the frame groups sent by the sending terminal, the method further comprises:
sending a receiving abnormal state to the sending terminal to enable the sending terminal to send an I frame for resetting a video transmission state, in response to a first long-term reference frame buffer being not empty, a second long-term reference frame buffer being not empty, and a long-term reference frame in a previous frame group referenced by the long-term reference frame in the current frame group being not saved to a first buffer and a second buffer of a receiving terminal, according to identification information of the long-term reference frame.

17. The video sending apparatus of claim 10, wherein before setting the first frame in the current frame group to be the long-term reference frame that uses the first frame in the previous frame group as the reference, the processor is further configured to:
set the first frame in the current frame group to be an I frame in response to the situation of the first frame in the current frame group, wherein the I frame is an intra-frame coded frame configured to transmit full-frame image information.

18. The video sending apparatus of claim 10, wherein after setting the first frame in the current frame group to be the long-term reference frame that uses the first frame in the previous frame group as the reference, the processor is further configured to:
set any other frame in the current frame group to be a P frame that uses a previous frame thereof as a reference, wherein the P frame is a forward predictive coded frame for transmitting a difference value and a motion vector obtained by performing a comparison against the previous frame of the P frame.

19. The video sending apparatus of claim 10, wherein after sending the frame groups to the receiving terminal, the processor is further configured to:
obtain the long-term reference frame in the frame group and sending the long-term reference frame to the receiving terminal in response to an unsuccessful transmission of the long-term reference frame in the frame group, according to a frame group receiving state fed back by the receiving terminal.

20. The video sending apparatus of claim 10, wherein after sending the frame groups to the receiving terminal, the processor is further configured to:
save the long-term reference frame in the frame group to a first long-term reference frame buffer in response to a successful transmission of the long-term reference frame in the frame group, according to the frame group receiving state fed back by the receiving terminal.

\* \* \* \* \*